(12) United States Patent
Bour et al.

(10) Patent No.: US 6,488,089 B1
(45) Date of Patent: Dec. 3, 2002

(54) METHODS OF PLUGGING WELLS

(75) Inventors: Daniel L. Bour, Tehachapi, CA (US); William J. Caveny, Rush Springs, OK (US); David P. Ewert, Bakersfield, CA (US)

(73) Assignee: Halliburton Energy Services, Inc., Duncan, OK (US)

( * ) Notice: Subject to any disclaimer, the term of this patent is extended or adjusted under 35 U.S.C. 154(b) by 2 days.

(21) Appl. No.: 09/918,997

(22) Filed: Jul. 31, 2001

(51) Int. Cl.⁷ ................... E21B 33/00; E21B 33/13; C04B 7/00
(52) U.S. Cl. ............... 166/292; 166/285; 166/293; 166/300; 106/639
(58) Field of Search ............... 166/75.15, 285, 166/292, 293, 300; 106/639

(56) References Cited

U.S. PATENT DOCUMENTS

| | | | |
|---|---|---|---|
| 4,813,484 A | 3/1989 | Hazlett | 166/274 |
| 4,817,719 A | 4/1989 | Jennings, Jr. | 166/292 |
| 4,819,727 A | 4/1989 | Jennings et al. | 166/292 |
| 4,834,180 A | 5/1989 | Shu | 166/270 |
| 4,896,724 A | 1/1990 | Hazlett et al. | 166/285 |
| 4,898,242 A | 2/1990 | Jennings, Jr. | 166/285 |
| 4,899,819 A | 2/1990 | Hazlett et al. | 166/285 |
| 5,343,952 A * | 9/1994 | Cowan et al. | 166/285 |
| 5,454,867 A | 10/1995 | Brothers et al. | 106/724 |
| 6,098,712 A | 8/2000 | Burts, Jr. | 166/295 |

OTHER PUBLICATIONS

Paper entitled "Bentonite Plugging Guidelines Operational Field Rules" Dated Apr. 16, 2001; Department of Conservation, State of California.

Paper entitled "Agglomeration of Cement to Facilitate Transportation" By Richard Turton, Huma Hakim, Alfred Stiller and Lewis R. Norman, Presented Nov. 2000.

\* cited by examiner

*Primary Examiner*—David Bagnell
*Assistant Examiner*—Brian Halford
(74) *Attorney, Agent, or Firm*—Craig W. Roddy; C. Clark Dougherty, Jr.

(57) ABSTRACT

Methods of forming one or more plugs in a well bore are provided. The methods basically comprise the steps of dropping into the well bore a cementitious material which will delayedly react with water therein to form an impermeable solid and which has been formed into agglomerates of sufficient weight to sink through the water and other fluids and materials in the well bore. The agglomerates are dropped in a quantity sufficient to form a mass of the agglomerates in the well bore. Thereafter, the mass of agglomerates is allowed to react with the water in the well bore and set into an impermeable solid plug therein.

20 Claims, No Drawings

METHODS OF PLUGGING WELLS

BACKGROUND OF THE INVENTION

1. Field of the Invention

The present invention relates to improved economical methods of forming one or more impermeable solid plugs in well bores.

2. Description of the Prior Art

When an oil, gas, water or other type of well penetrating one or more subterranean formations is a dry hole, has been depleted or is otherwise abandoned, the well bore must be plugged. The conventional technique for plugging a well bore has heretofore been to spot plugs of a hydraulic cement mixture at various levels in the well. The depths and compressive strengths of the cement plugs are typically specified by local governing regulatory agencies. Generally, a plug will be spotted and allowed to set at or near the bottom of the well bore with additional plugs spotted on top of mechanical plugs or bridging device at various levels and allowed to set.

The setting of mechanical plugs or bridging devices and the spotting of cement compositions onto the mechanical devices by pumping the cement compositions through work strings or the like as has heretofore been required is relatively time consuming and expensive.

Thus, there are needs for improved methods of forming plugs in well bores which are simple to carry out and relatively inexpensive.

SUMMARY OF THE INVENTION

The present invention provides improved methods of forming one or more plugs in abandoned well bores which meet the needs described above and overcome the deficiencies of the prior art. The methods of the present invention basically comprise the following steps. A cementitious material which will delayedly react with water to form an impermeable solid and which has been formed into agglomerates of sufficient weight to sink through the water and other fluids and materials in a well bore to be plugged are dropped into the well bore. The cementitious material agglomerates are dropped in a quantity sufficient to form a mass of the agglomerates adjacent to the natural bottom of the well bore. Thereafter, the mass of the cementitious material agglomerates is allowed to react with the water in the well bore to thereby form an impermeable solid plug therein.

When a plug must be placed above the natural bottom or above a first plug on the natural bottom of the well bore, one or more artificial bottoms are formed above the natural bottom or the first plug. A preferred simple and economical technique for forming an artificial bottom in the well bore in accordance with this invention is to pour sand into the well bore to fill the well bore to the level at which a plug is required to be formed. Thereafter, the cementitious material agglomerates of this invention are dropped into the well bore in a quantity sufficient to form a mass of the agglomerates therein. The agglomerates are then allowed to react with water in the well bore so that an impermeable solid plug is formed therein. If the formation of an artificial bottom utilizing sand or other similar relatively inexpensive material is impractical, a mechanical plug or bridging device can be utilized.

The cementitious material utilized can be a material which hydrates or otherwise reacts in the presence of water to form an impermeable solid mass in a well bore. The cementitious material can be formed into agglomerates in any convenient way such as by compacting the material, extruding the material or pelletizing the material whereby when the agglomerates are contacted with water they readily break apart and react with the water.

It is, therefore, a general object of the present invention to provide improved methods of forming plugs in abandoned well bores.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of forming one or more plugs in abandoned well bores. The methods are basically comprised of the following steps. A cementitious material which will delayedly react with the water in the well bore to form an impermeable solid and which has been formed into agglomerates of sufficient weight to sink through the water and other fluids and materials in the well bore is dropped into the well bore. The agglomerates are dropped in a quantity sufficient to form a mass of the agglomerates on the natural bottom of the well bore or on an artificial bottom formed therein. Thereafter, the mass of cementitious material agglomerates is allowed to react with the water in the well bore to thereby form an impermeable solid plug therein.

A variety of cementitious materials can be utilized in accordance with the present invention including, but not limited to, a hydratable cement selected from the group consisting of Portland and equivalent cements, pozzolana cements, gypsum cements, high alumina content cements, silica cements, high alkalinity cements, slag cements and the foregoing cements which are finely ground. Of these, Portland or the equivalent cement is preferred.

The cementitious material may also contain one or more additives including, but not limited to, weighting materials, bentonite clay, cement set retarding additives, cement set accelerators, cement dispersing additives, cement fluid loss additives, cement expanding additives, gas generating and foaming additives, crystalline silica, amorphous silica, potassium chloride, calcium chloride, sodium chloride, surfactants, viscosifying polymers and mixtures thereof. Such additives are well known to those skilled in the art and are commonly utilized in well cements and drilling fluids.

The cementitious material agglomerates can be formed utilizing various agglomerating processes including extruding processes, compacting processes and pelletizing processes. A binder which is slowly water soluble can be mixed with the cementitious material to maintain the integrity of the agglomerates until after they reach the natural or artificial bottom of a well bore whereupon the agglomerates disintegrate or break apart and react with the water in the well bore to form a plug of the required compressive strength, i.e., a compressive strength in the range of from about 50 psi to about 10,000 psi. Examples of slowly water soluble binding materials which can be used to form the agglomerates include, but are not limited to, sodium metasilicate or potassium metasilicate.

As mentioned above, in the case where a plug is to be formed on the natural bottom of the well bore, the cementitious material agglomerates are dropped into the well bore whereby they sink through the water and other fluids and materials in the well bore to the natural bottom whereon they form a mass of cementitious material agglomerates adjacent to the natural bottom. As will be understood by those skilled in the art, the well bore to be abandoned and plugged is usually filled with a water based drilling fluid through which the agglomerates sink and upon reaching and being placed on the bottom, the agglomerates react with water in the drilling fluid to form a solid plug. Abandoned well bores can also contain oil based drilling fluids or produced oil, in which case the oil based drilling fluid or produced oil can be displaced by a quantity of water introduced into the well bore prior to dropping the cementitious material agglomerates therein. Upon reaching the bottom of the well bore and forming a sufficient mass therein, the cementitious material agglomerates swell, break apart and react with water to form a solid plug of required strength.

When one or more plugs must be placed above the natural bottom or above a first plug formed on the natural bottom in accordance with this invention, one or more artificial bottoms are formed above the natural bottom or the first plug formed thereon. A preferred simple and economical technique for forming one or more artificial bottoms in the well bore involves the introduction of sand into the well bore to fill the well bore from the natural bottom or from a first plug thereon to the level at which a plug is required to be formed. That is, when a plug is to be formed a distance above the natural bottom or a second plug is to be formed above a first plug formed on the natural bottom of the well bore, sand is poured into the well bore which sinks through and displaces water and other fluids in the well bore. The quantity of sand dropped in the well bore is such that a first artificial bottom is formed by the sand at the required distance above the natural bottom or the first plug formed thereon. Thereafter, a plug is formed on top of the artificial bottom in the same manner as described above. One or more additional plugs can be formed in the well bore at specified distances above the plug formed on the artificial bottom by repeating the introduction of sand and cementitious material agglomerates into the well bore. As will be understood, any inexpensive inert particulate material can be substituted for the sand so long as the material has a density sufficient to sink through and displace the water and other fluids in the well bore.

If the formation of an artificial bottom utilizing sand or other similar relatively inexpensive material is impractical, mechanical plugs or bridging devices can be utilized to form one or more artificial bottoms in the well bore.

Thus, an improved method of the present invention for forming a plug in a well bore containing water is basically comprised of the steps of: (a) dropping into the well bore a cementitious material which will delayedly react with the water therein to form an impermeable solid and which has been formed into agglomerates of sufficient weight to sink through the water and other fluids and materials in the well bore, the agglomerates being dropped in a quantity sufficient to form a first mass of the agglomerates in the well bore; and then (b) allowing the mass of the agglomerates to react with the water in the well bore to thereby form an impermeable solid plug therein.

Another method of this invention for forming a first plug on or near the natural bottom of a well bore containing water and one or more plugs at one or more locations above the natural bottom comprises the steps of: (a) dropping into the well bore a cementitious material which will delayedly react with the water to form an impermeable solid and which has been formed into agglomerates of sufficient weight to sink through the water and other fluids and materials in the well bore, the agglomerates being dropped in a quantity sufficient to form a first mass of the agglomerates on or near the natural bottom of the well bore; (b) forming an artificial bottom in the well bore above the first mass of the agglomerates; (c) dropping additional agglomerates into the well bore in a quantity sufficient to form a second mass of the agglomerates adjacent to the artificial bottom in the well bore; (d) repeating steps (b) and (c) if necessary to form one or more additional masses of said agglomerates above the second mass of said agglomerates; and (e) allowing the masses of the agglomerates formed in the well bore to react with the water in the well bore to thereby form impermeable solid plugs therein.

Thus, the present invention is well adapted to carry out the objects, ends and advantages mentioned as well as those which are inherent therein. While numerous changes may be made by those skilled in the art, such changes are encompassed within the spirit of this invention as defined by the appended claims.

What is claimed is:

1. A method of forming a plug in a well bore containing water comprising the steps of:
   (a) dropping into said well bore a cementitious material which will delayedly react with said water therein to form an impermeable solid and which has been formed into agglomerates of sufficient weight to sink through said water and other fluids and materials in said well bore, said agglomerates being dropped in a quantity sufficient to form a first mass of said agglomerates in said well bore; and then
   (b) allowing said mass of said agglomerates to react with said water in said well bore to thereby form an impermeable solid plug therein.

2. The method of claim 1 wherein said cementitious material is comprised of a hydratable cement selected from the group consisting of Portland and equivalent cements, pozzolana cements, gypsum cements, high alumina content cements, silica cements, high alkalinity cements, slag cements and the foregoing cements which are finely ground.

3. The method of claim 2 wherein said cementitious material further comprises one or more additives selected from the group consisting of weighting materials, bentonite, cement set retarding additives, cement set accelerators, cement dispersing additives, cement fluid loss additives, cement expanding additives, gas generating and foaming additives, crystalline silica, amorphous silica, potassium chloride, calcium chloride, sodium chloride, surfactants, viscosifying polymers and mixtures thereof.

4. The method of claim 1 wherein said cementitious material agglomerates are formed by extruding said cementitious material.

5. The method of claim 1 wherein said cementitious material agglomerates are formed by compacting said cementitious material.

6. The method of claim 1 wherein said cementitious material agglomerates are formed by palletizing said cementitious material.

7. The method of claim 1 wherein said mass of said agglomerates is formed adjacent to the natural bottom of said well bore.

8. The method of claim 1 wherein said mass of said agglomerates is formed adjacent to an artificial bottom formed above the natural bottom of said well bore.

9. The method of claim 8 wherein said artificial bottom is formed in said well bore by pouring sand in said well bore.

10. The method of claim 8 wherein said artificial bottom is formed in said well bore by placing a mechanical plug in said well bore.

11. A method of forming a first plug on or near the natural bottom of a well bore containing water and one or more plugs at one or more locations above the natural bottom comprising the steps of:

(a) dropping into said well bore a cementitious material which will delayedly react with said water to form an impermeable solid and which has been formed into agglomerates of sufficient weight to sink through said water and other fluids and materials in said well bore, said agglomerates being dropped in a quantity sufficient to form a first mass of said agglomerates on or near the natural bottom of said well bore;

(b) forming an artificial bottom in said well bore above said first mass of said agglomerates;

(c) dropping additional agglomerates into said well bore in a quantity sufficient to form a second mass of said agglomerates adjacent to said artificial bottom in said well bore;

(d) repeating steps (b) and (c) if necessary to form one or more additional masses of said agglomerates above said second mass of said agglomerates; and (e) allowing said masses of said agglomerates formed in said well bore to react with said water in said well bore to thereby form impermeable solid plugs therein.

12. The method of claim 11 wherein said cementitious material is comprised of a hydratable cement selected from the group consisting of Portland and equivalent cements, pozzolana cements, gypsum cements, high alumina content cements, silica cements, high alkalinity cements, slag cements and the foregoing cements which are finely ground.

13. The method of claim 12 wherein said cementitious material further comprises one or more additives selected from the group consisting of weighting materials, bentonite, cement set retarding additives, cement set accelerators, cement dispersing additives, cement fluid loss additives, cement expanding additives, gas generating and foaming additives, crystalline silica, amorphous silica, potassium chloride, calcium chloride, sodium chloride, surfactants, viscosifying polymers and mixtures thereof.

14. The method of claim 11 wherein said cementitious material agglomerates are formed by extruding said cementitious material.

15. The method of claim 11 wherein said cementitious material agglomerates are formed by compacting said cementitious material.

16. The method of claim 11 wherein said cementitious material agglomerates are formed by pelletizing said cementitious material.

17. The method of claim 11 wherein said artificial bottom of step (b) is formed in said well bore by pouring sand in said well bore on top of said first mass of said agglomerates.

18. The method of claim 11 wherein said artificial bottom of step (b) is formed in said well bore by placing a mechanical plug therein.

19. The method of claim 11 wherein said cementitious material is comprised of Portland cement or the equivalent.

20. The method of claim 19 wherein said cementitious material further comprises a cement set retarder.

* * * * *